United States Patent [19]

Sylvester et al.

[11] Patent Number: 4,867,502

[45] Date of Patent: Sep. 19, 1989

[54] VAN CAMPER

[76] Inventors: Christopher J. Sylvester; Mary E. Sylvester, both of Grand Island, N.Y.

[21] Appl. No.: 251,755

[22] Filed: Oct. 3, 1988

[51] Int. Cl.⁴ .............................................. B60P 3/34
[52] U.S. Cl. .................................... 296/161; 296/26; 135/88
[58] Field of Search .......................... 296/161, 165, 26; 135/88

[56] References Cited

U.S. PATENT DOCUMENTS

| | | | |
|---|---|---|---|
| 3,333,594 | 8/1967 | Moss | 135/88 |
| 3,871,700 | 3/1975 | Brownlee | 135/88 |
| 3,968,809 | 7/1976 | Beavers | 296/161 |
| 4,065,166 | 12/1977 | Shoemaker | 296/26 |
| 4,504,049 | 3/1985 | Straub | 296/26 |
| 4,729,594 | 3/1988 | Hoff | 296/161 |

*Primary Examiner*—Robert R. Song
*Attorney, Agent, or Firm*—Wallace F. Neyerlin

[57] ABSTRACT

A tent-like enclosure structure is described. The structure is particularly adapted and constructed as an extension for and in combination with a van having a solid upward opening rear door; the top of said enclosure when in use to be held in position by and above the opened rear door of the vehicle. The enclosure has side and end portions, each of which portions extends from the top of the enclosure to the ground, and each of which enclosure portions is substantially trapezoidal in shape, with the top and bottom sides being substantially parallel to each other with the top side being the shorter side. Said enclosure also has a bottom floor panel, to the sides and end of which are attached the bottom edges of each of the aforesaid trapezoidally shaped portions of the enclosure structure. The combination can quickly and easily be put together by the typical users of such combination.

8 Claims, 2 Drawing Sheets

VAN CAMPER

BACKGROUND OF THE INVENTION

1. Field of the Invention

This invention relates to a tent-like enclosure structure particularly adapted and constructed as an extension for a van with a solid, upward-opening rear door. The invention also relates to the combination of a tent-like enclosure structure and a van with a solid, upward opening rear door, said tent-like structure being particularly adapted and constructed as an extension for the van vehicle, the top of said enclosure being held in position by the opened rear door of the vehicle.

2. Description of the Prior Art

A patent search was carried out directed to a tent-like unit to be attached to the rear opening of a van. The following patents were located:

| | | |
|---|---|---|
| 3,756,649 | Wines | 9/4/73 |
| 3,968,809 | Beavers | 7/13/76 |
| 4,139,229 | Cooper | 2/13/79 |
| 4,729,594 | Hoff | 3/8/88 |

The Wines patent discloses a tent unit, but (as will hereinafter be made clear) is much less dependant upon the vehicle, to which it is attached, than is the tent unit of the present invention.

The Beavers patent is relevant in that it also relates to a van tent for open-ended vans, as does the present invention; however, the van tent of this patent is not particularly adapted and constructed as an extension for a van with a solid, upward-opening rear door; nor does the van of this patent possess such an upward-opening rear door. Also, the supporting frame of this patent, to which much of its disclosure is directed, is entirely unrelated to the manner in which the tent-like enclosure structure of the present invention is supported.

The Cooper patent, as well as the Hoff patent, disclose rigid and/or tent-like structures that extend from the van and form a camper, with and without a tent structure. They are unrelated to vans of the present invention having a solid upward opening rear door, and are cited merely to show the state of the art.

OBJECTS OF THE INVENTION

It is an object of the present invention to enhance the utility of vans which possess solid, upward opening rear doors.

It is another object of the present invention to accomplish the foregoing object by providing a tent-like enclosure structure which is particularly adapted and constructed as an extension for a van having such a solid, upward opening rear door.

It is another object of the present invention to provide a novel combination of such a van and such a tent-like enclosure structure, which combination can quickly and easily be put together by the typical users of such combination, employing no or a minimum of extraneous and/or mechanical adjuncts in connection with same.

It is another object of the present invention to accomplish the foregoing without doing any damage to; and-/or making any holes in the van to which the enclosure structure is attached; and/or without making any attachments of any mechanical adjuncts (such as screws, or nuts and bolts, or clamps) to assist in joining the tent-like enclosure structure to the van.

It is another object of the present invention to accomplish the foregoing objects in a relatively inexpensive manner, but at the same time in a comfortable and aesthetically pleasing manner.

A better understanding of the present invention as well as other objects and advantages thereof will become apparent from the following detailed description, appended claims, and the accompanying drawings.

SUMMARY OF THE INVENTION

The invention relates to a tent-like enclosure structure particularly adapted and constructed as an extension for a van with a solid, upward-opening rear door; and also to the combination of such a tent-like enclosure structure and such a van. The top of the enclosure, when erected, is held in position by the opened rear door of the vehicle. The enclosure possesses side and end portions, each of which enclosure portions is substantially trapezoidal in shape, with the top and bottom sides being substantially parallel to each other, with the top side being the shorter side. The aforesaid geometric shape of the enclosure is assisted in its construction and in the maintenance of its shape while in use by a floor panel material, to the sides and end of which are attached the bottom edges of each of the aforesaid trapezoidally shaped portions of the enclosure structure.

A description of the accompanying drawings now follows.

DETAILED DESCRIPTION OF THE DRAWINGS

Figure 1:
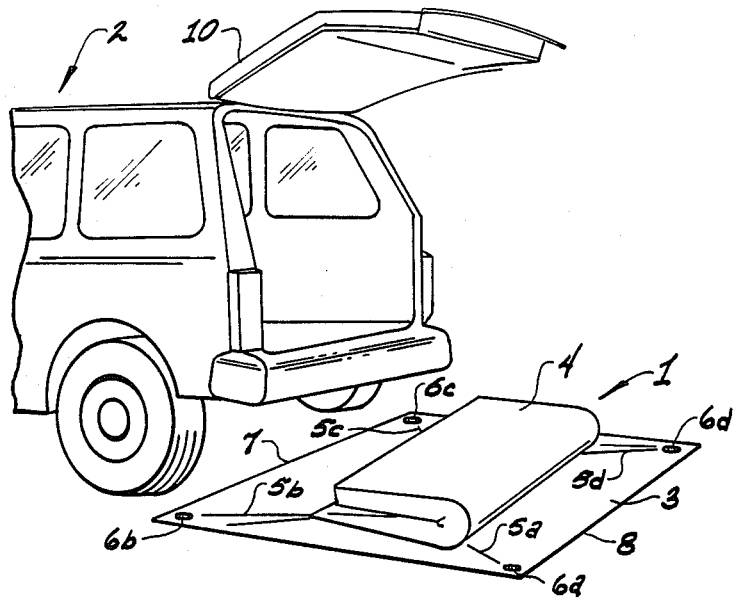
FIG. 1 is a broad perspective view of the type of van being referred to herein together with a view of the tent-like enclosure structure on the ground, aligned with the van and ready for being attached to the van.

Referring now to FIG. 1, the tent-like enclosure structure is designated broadly by the numeral 1, and the van with the upward-opening rear door is designated broadly by the numeral 2.

The tent-like enclosure structure is comprised of a floor mat 3 which outlines the base floor dimensions and configuration of the enclosure structure. Attached to the fllor, such as by being sewn thereto, is the enclosure 4 proper, shown in its collapsed condition. The diagonal lines 5a, 5b, 5c and 5d indicate the areas where the enclosure 4 lifts off from the floor mat 3. Holes of eyelets 6a, 6b, 6c and 6d are present in the floor mat to permit attaching the structure to the ground such as by means of typical tent stakes about 5–6 inches in length which can be hammered into the ground through the eyelets to keep the mat in place and to properly align it with the van. (Long nails, such as aluminum gutter nails could also be used for this purpose). As a matter of preferred procedure, the floor mat is so arranged, in relation to the van, that eyelet 6b is about 6 inches behind the left tire of the van and also about 6 inches to the left thereof; and eyelet 6c is correspondingly arranged so as to be about 6 inches behind the right rear tire of the van, and also about 6 inches to the right thereof. After the mat is so located, the tent stakes are then struck through the eyelets in order to fasten the end 7 of the mat nearest to the van securely to the ground. The rest of the mat is then pulled squarely away from the van and made essentially taut and then tent stakes are struck through eyelets 6a and 6d in order to fasten end 8 of the mat securely to the ground.

The van 2 shown in FIG. 1 has, as an essential feature in the present invention, an upward opening rear door 10, over and upon which the tent-like enclosure is designed to be covered. Such an upward opening rear door of the vans of the present invention typically have hydraulic arms (not shown) designed and used to keep the rear door in a raised position, as shown in FIG. 1. Or mechanical arms (also not shown) may be used to keep the rear door open.

Figure 2:
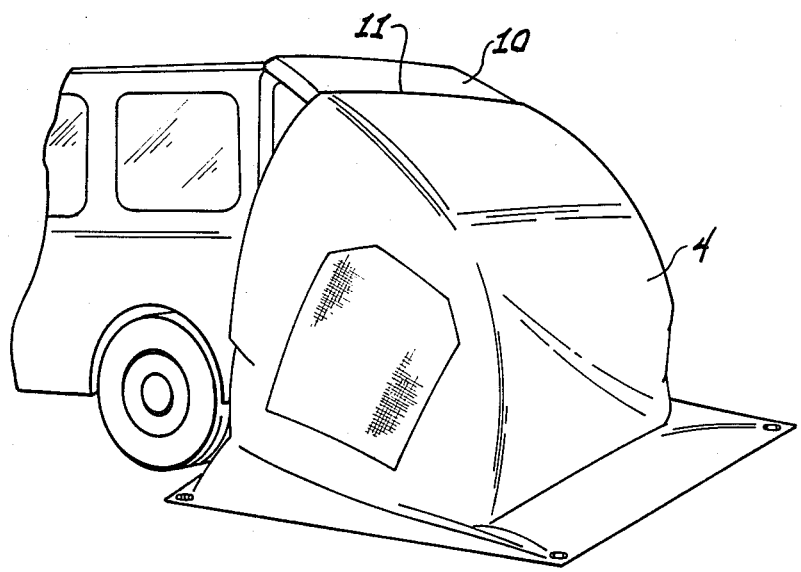
FIG. 2 is a side elevational view of the enclosure structure in the process of being attached to the van, over the top of the upward-opening, rear door of the van.
Figure 3:
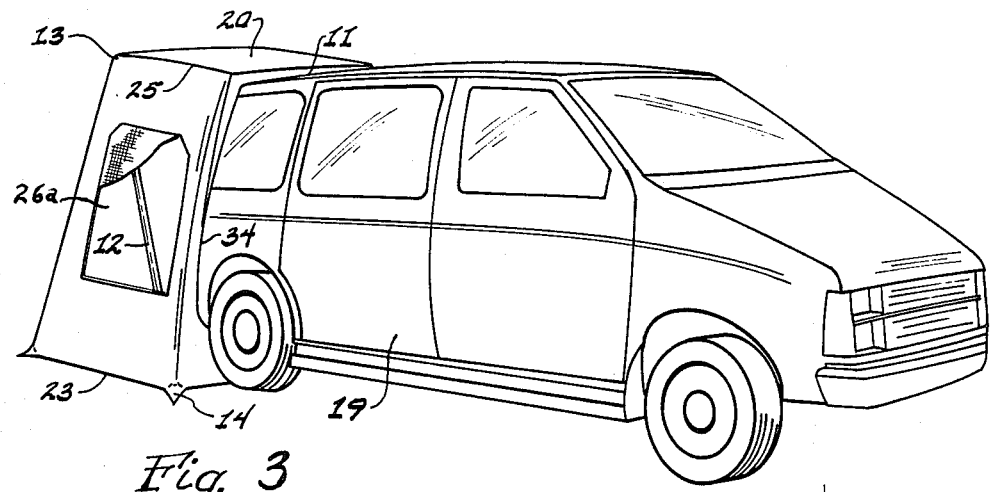
FIG. 3 is a side elevational view of the completed erection of the combination assembly.

After the positioning of the tent-like enclosure structure is completed, the raising or erection of the structure is carried out, as is partially illustrated in FIG. 2. This is done by partially lowering the tailgate and then covering it with the enclosure material. Two persons typically carry this out, husband and wife, father and son, etc., with one situated on each side of the vehicle. Each person, in unison, picks up his side of the loose tent material 4 and simultaneously pushes down on the open rear door, so as to start covering it with the tent material. The dimensions are coordinated so that the leading edge 11 of the tent material can be stretched so as to completely cover the rear door in its fully upraised position and to snugly fit over the top of the van at its rear end, as shown in FIG. 3. An elastic rope material is sewn into the hems of the tent material 4 at its various edges that come into contact with the top of the van, its sides and also along its bumper, so that the edging of the tent material can be fitted very snugly to the van. (Although contained within the hem, the ends of the elastic rope are free near the bumper area, so that after the initial surrounding of the van with the tent material 4 after fully raising the rear door, the rope material may be drawn tight and tied to make the enclosure essentially rain and bug tight.) If need be, for added rigidity of the structure, diagonal poles 12 may be employed on each side of the enclosure structure. Typically the top and bottom corners of the enclosure would be reinforced so as to prevent tearing by the tips of the poles, and the poles themselves would have spaced notches or holes therein, through which pins could be placed, so as to control their length and the resultant rigidity of the total structure. Such expandable poles are typically made from aluminum and are readily commercially available; however, the use of such poles is not normally necessary, except under extreme weather conditions, in order to maintain the "in-use" shape of the completed assembly. The side door 19 of the van of FIG. 3 is typically a sliding door through which the van may be entered, leading into the enclosure structure.

Figure 4:
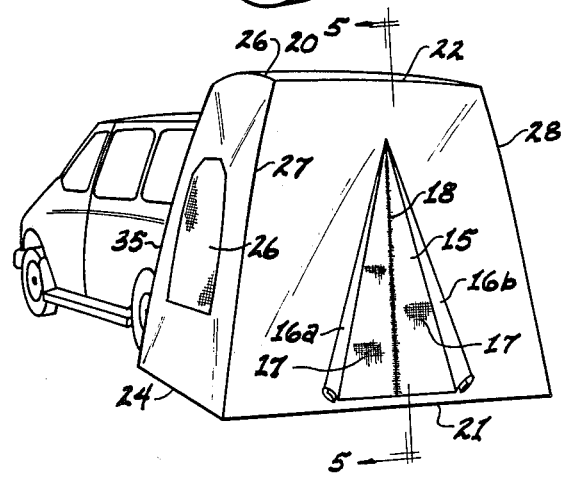
FIG. 4 is a rear elevational view of the completed assembly, showing the rear opening into the enclosure structure.

However, and as illustrated in FIG. 4, the enclosure structure will typically have an opening, which may be referred to as a weather and privacy door, designated generally by the numeral 15, at the rear end thereof, through which the users of the structure may conveniently enter. The opening will typically have turned back flaps 16a and 16b and a nylon (or other material) mesh 17 closing the entry way be means of zipper 18. Thus users of the combination van and tent-like enclosure have their choice of entering it through or from the side of the van, or from within the van, or by entering it through the rear opening 15.

The view of FIG. 3 illustrates the right side of the enclosure structure; that of FIG. 4 shows the left side and also the rear end or rear side of the enclosure structure. It will be noted that the top 20 of the enclosure is held in position by and above the solid, upward-opening rear door of the vehicle; and that each of the side and end portions of the enclosure extend from the top 20 of the enclosure to the ground, and that each of the enclosure portions (i.e. the left side, the right side and the rear side) is substantially trapezoidal in shape, with the top and bottom sides or edges being substantially parallel to each other, with the top side of each portion being the shorter side.

Representative dimensions of the enclosure structure of the present invention are as follows:

The bottom edge 21 of the end trapezoidal portion is 84 inches, in length; the top edge 22 of the end trapezoidal portion is 54 inches in length; the bottom edges 23 and 24 of each of the side trapezoidal portions are 66 inches in length; and the top edges 25 and 26 of each of the side trapezoidal portions are 46 inches in length. Edges 27 and 28 of the end and trapezoidal portions are each 76½ inches in length. The area of the bottom of the enclosure is approximately 38.5 square feet.

Besides the opening 15 in the end portion of the enclosure structure, the side portions also typically have openings 26 and 26a therein, for ventilation purposes. These openings typically are covered with an open mesh material and the insides thereof have flaps (not shown) which may be used to cover the openings for privacy or rain or weather protection purposes. One side of each of the flaps is sewn to the inner walls of each of the side portions of the enclosure structure, and the other sides of the flaps attach thereto such as by means of zippers or by means of Velcro lining at the edges. Simple hand pressure against the Velcro edges of the flaps thus enables their easily being closed whenever desired.

Figure 5:
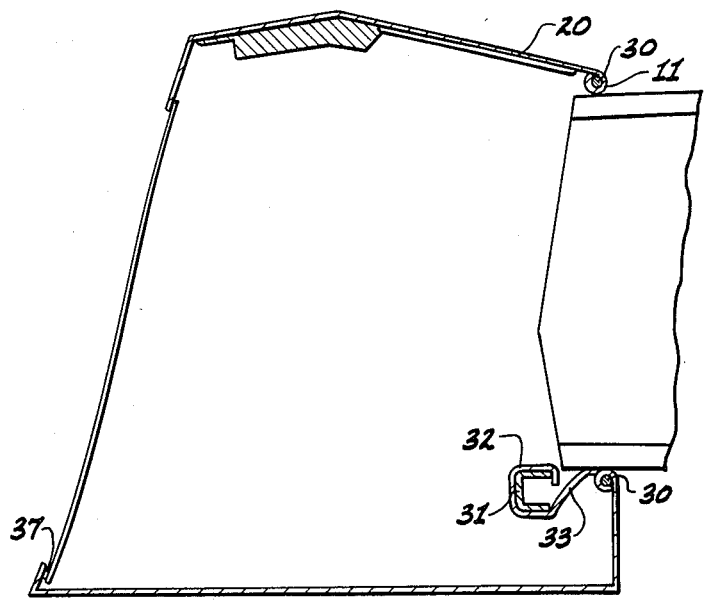
FIG. 5 is a cross-sectional view of the enclosure—van combination, taken along the line 5—5 of FIG. 4, and showing how the tent-like material snugly attached to and wraps around portions of the van at the roof and also at the bumper.

The cross-sectional view of the combination van-enclosure structure shown in FIG. 5 is primarily set forth to illustrate how the combination is made weather-proof. As previously stated, an elastic rope material is sewn into the hems of the tent material 4 at its various edges that come into contact with the van, at its top, at its sides, and also along its bumper. This elastic rope 30, shown in cross-section in FIG. 5, permits drawing the tent material tight against various contact points with the van, such as at the roof area 11 (FIGS. 3 and 5), over the bumper 31 at area 32, along the underside of the van at area 33 and along the sides of the van at areas 34 and 35. A Velcro strip 37 is utilized along the bottom of the rear entry way opening 15, in order to easily attach or detach the mesh material 17 from the base of the opening for ingress and egress purposes.

ADVANTAGES OF THE PRESENT INVENTION

The tent-like enclosure fits snugly over the upward-opening door or tailgate of the van. This is accomplished by means of the elastic cord sewn into the seam of the fabricated tent material, thus forming a substantially watertight seal.

The sewn-in floor is useful to cover and insulate against the ground. The sewn in floor also serves to form the shape and dimensions of the sidewalls and end wall.

The two screen windows and the screen door provide ventilation and protection against insects; but as shown also, have zippered flaps and Velcro lining to seal-close the enclosure against rain and/or cold weather.

The enclosure, combined with the van, provides enhanced capability for camping, changing attire, privacy, storage, screen room, sleeping and recreation. It is spacious enough to accommodate putting up cots or sleeping bags or portable mattresses plus portable chairs and provides for weather protection and off-road hospitality. The combination takes advantage of the upward-opening rear door construction of such vehicles for considerably enhanced recreational purposes.

The invention is particularly advantageous to such vehicle owners for camping, "beaching", pinching, traveling and vacationing.

As has been stated, the tent-like enclosure unit is designed to be an accessory for mid-size vans with tailgates that lift up. It fits like a sock and is very easy to set up; average time for two persons working on each side of the van, about five to ten minutes or less. It provides sleeping area for three adults or more children. It can be used as a change area at the beach or in a park; and it is virtually bug-free and weather proof and has good ventilation.

Another use of the present ivnention is its potential advantageous employment by such parties as electric companies, telephone companies and utility sewer companies. Such parties frequently send their employees out with vans, such as are used in the present invention, for emergency field service, to work on buried electric cables or telephone lines or blocked-up sewers, etc. Such emergencies typically arise during and/or due to adverse weather conditions; and it would thus be helpful for such employees to put the enclosure structure of the present invention over the area to be worked on, for example, over an opened manhole, on order to work on the problem while being protected from the rain or snow, or other type weather conditions. For such purpose, the floor mat of the structure would thus be provided with an access hole in or near the center of same for the employee to fit through and to work on the particular problem being encountered.

It will also be clear from the foregoing description of how the tent-like enclosure is attached to the van that all of the various previously described objects of the invention are realized and/or accomplished through the features of the design of the enclosure and the manner in which it is combined to the van vehicle.

Although the invention has been described with respect to a particular van (i.e. a Dodge Caravan), and although the dimensions set forth herein are representative for this particular van, it should be appreciated that the invention is also applicable to other makes of vans having solid, upward-opening rear doors; and that typical dimensions for the enclosure structure to the dimensions of the van to which the enclosure structure is to be attached, and also to the size of the rear doors of such vans.

Particular makes of vans to which the idea of the present invention can be applied are: Dodge, Plymouth, Ford, Mitsubishi, Nissan, Jeep, Toyota and Volkswagons.

What is claimed is:

1. A tent-like enclosure structure particularly adapted and constructed as an extension for a van with a solid upward opening rear door, the top of said enclosure to be held in position by and above the opened rear door of the vehicle said enclosure also having side and end portions, each of which portions extend from the top of the enclosure to the ground, and each of which enclosure portions is substantially trapezoidal in shape, with the top and bottom sides being substantially parallel to each other with the top side being the shorter side, said enclosure also having a bottom floor panel, to the sides and end of which are attached the bottom edges of each of the aforesaid trapezoidally shaped portions of the enclosure structure.

2. The tent-like enclosure structure of claim 1 wherein the approximate dimensions of same are as follows:

the bottom of the end trapezoid is 84 inches in length;
the top of the end trapezoid is 54 inches in length;
the bottom of each of the side trapezoids is 66 inches in length;
the top of each of the side trapezoids is 46 inches in length;
the abutting edges of the end and side trapezoidal portions are each 76½ inches in length; and wherein the main area of the bottom floor panel of the enclosure is approximately 38.5 square feet.

3. The tent-like enclosure structure of claim 1 wherein the top of said enclosure structure is held in position by means of one or more rigid poles extending from the ground to the top of the enclosure.

4. The tent-like enclosure structure of claim 1 wherein each of the side and end portions have openings therein for ventilation purposes, said openings being covered with an open mesh material, and flaps which may be used to cover the openings for privacy or rain or weather protection purposes.

5. The tent-like enclosure structure of claim 1 wherein the bottom floor panel has an access hole in or near the center of same large enough for a person to fit through.

6. The combination of a tent-like enclosure structure and a van with a solid upward-opening rear door, said tent-like structure being particularly adapted and constructed as an extension for the van vehicle, the top of said enclosure being held in position by and above the opened rear door of the vehicle, said enclosure also having side and end portions, each of which portions extend from the top of the enclosure to the ground, and each of which enclosure portions is substantially trapezoidal in shape, with the top and bottom sides being substantially parallel to each other with the top side being the shorter side, said enclosure also having a bottom floor panel, to the sides and end of which are attached the bottom edges of each of the aforesaid trapezoidally shaped portions of the enclosure structure.

7. The combination of claim 6 wherein the bottom floor panel has an access hole in or near the center of same large enough for a person to fit through.

8. The combination of claim 6 wherein the van is selected from the group of vans bearing the name Dodge, Plymouth, Ford, Mitsubishi, Nissan, Jeep, Toyota and Volkswagon.

* * * * *